United States Patent
Cheong et al.

(10) Patent No.: US 10,312,550 B2
(45) Date of Patent: Jun. 4, 2019

(54) MOLTEN LITHIUM-SULFUR BATTERY WITH SOLID ELECTROLYTE AND METHOD OF MANUFACTURING THE SAME

(71) Applicant: AGENCY FOR DEFENSE DEVELOPMENT, Daejeon (KR)

(72) Inventors: Hae-Won Cheong, Sejong-si (KR); Chae-Nam Im, Sejong-si (KR); Ji-Youn Kim, Cheonan-si (KR); Sung-Ho Kang, Daejeon (KR); Jang-Hyeon Cho, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 15/679,383

(22) Filed: Aug. 17, 2017

(65) Prior Publication Data

US 2019/0006720 A1 Jan. 3, 2019

(30) Foreign Application Priority Data

Jun. 28, 2017 (KR) ........................ 10-2017-0081970

(51) Int. Cl.
| | | |
|---|---|---|
| *H01M 10/39* | (2006.01) | |
| *H01M 10/0525* | (2010.01) | |
| *H01M 2/02* | (2006.01) | |
| *C01D 3/00* | (2006.01) | |
| *C01B 17/02* | (2006.01) | |
| *C01D 15/10* | (2006.01) | |

(52) U.S. Cl.
CPC ....... *H01M 10/399* (2013.01); *H01M 2/0247* (2013.01); *H01M 10/0525* (2013.01); *C01B 17/0221* (2013.01); *C01D 3/00* (2013.01); *C01D 15/10* (2013.01)

(58) Field of Classification Search
None
See application file for complete search history.

(56) References Cited

U.S. PATENT DOCUMENTS

| | | | | |
|---|---|---|---|---|
| 3,756,856 A | * | 9/1973 | Tennenhouse | H01M 2/08 429/104 |
| 3,993,503 A | * | 11/1976 | Ludwig | H01M 10/3909 429/103 |
| 4,237,200 A | * | 12/1980 | Weddigen | H01M 10/3909 429/102 |
| 4,683,179 A | * | 7/1987 | Langpape | H01M 10/3909 429/104 |

(Continued)

FOREIGN PATENT DOCUMENTS

| | | |
|---|---|---|
| KR | 20020039824 A | 5/2002 |
| KR | 10-1511206 B1 | 4/2015 |
| KR | 20160020280 A | 2/2016 |

*Primary Examiner* — Rena Dye Cronin
(74) *Attorney, Agent, or Firm* — LRK Patent Law Firm

(57) ABSTRACT

This invention relates to a lithium-sulfur battery and a method of manufacturing the same, and more particularly, to a molten salt-based lithium-sulfur battery and a method of manufacturing the same, in which a metal foam including lithium or a lithium alloy, as an anode active material, and sulfur or metal sulfide, as a cathode active material, is used as a support and a current collector, and a solid-state electrolyte is used to thus improve energy density and power output characteristics.

28 Claims, 7 Drawing Sheets

(56) References Cited

U.S. PATENT DOCUMENTS

| | | | | |
|---|---|---|---|---|
| 5,582,623 A * | 12/1996 | Chu | ........................ | H01M 4/02 29/623.1 |
| 6,110,619 A * | 8/2000 | Zhang | ...................... | H01B 1/12 252/519.34 |
| 6,210,831 B1 * | 4/2001 | Gorkovenko | ....... | H01M 4/0485 429/213 |
| 2013/0141050 A1 * | 6/2013 | Visco | .................... | H01M 8/188 320/130 |
| 2015/0072236 A1 * | 3/2015 | Um | ....................... | C22C 1/0408 429/219 |
| 2016/0294000 A1 * | 10/2016 | He | .................... | H01M 10/0525 |
| 2017/0207484 A1 * | 7/2017 | Zhamu | ................ | H01M 4/5815 |
| 2017/0207488 A1 * | 7/2017 | Zhamu | .............. | H01M 10/0585 |

\* cited by examiner

MOLTEN LITHIUM-SULFUR BATTERY WITH SOLID ELECTROLYTE AND METHOD OF MANUFACTURING THE SAME

CROSS REFERENCE TO RELATED APPLICATION

This application claims priority to Korean Patent Application No. KR 10-2017-0081970, filed Jun. 28, 2017, which is hereby incorporated by reference in its entirety into this application.

BACKGROUND OF THE INVENTION

1. Technical Field

The present invention relates to a lithium-sulfur battery and a method of manufacturing the same, and more particularly, to a molten salt-based lithium-sulfur battery and a method of manufacturing the same, in which a metal foam including lithium or a lithium alloy, as an anode active material, and sulfur or metal sulfide, as a cathode active material, is used as a support and a current collector, and a solid-state electrolyte is used to thus improve energy density and power output characteristics.

2. Description of Related Art

A conventional molten salt-based thermal battery, having a comparatively high operating temperature of about 500° C., is mainly composed of an anode comprising a lithium (Li) alloy and a cathode comprising iron disulfide (pyrite, $FeS_2$). However, the only elements that actually participate in the electrochemical reaction are lithium of the anode and sulfur (S) of the cathode, and thus theoretical limitations are imposed on increasing the energy density thereof. Furthermore, a molten salt-based electrolyte may undergo a phenomenon in which it changes into a liquid phase at the operating temperature thereof, and may thus leak. When the extent of leakage is severe, battery rupture due to short-circuit or power drop due to electrolyte depletion may occur. Accordingly, the use of the molten salt-based electrolyte in a battery is limited because of decreased electrochemical performance and also in consideration of the safety of a user and non-rechargeability thereof.

When the battery is overheated, the viscosity of the molten salt serving as the electrolyte may decrease, and thus the extent of leakage may become severe. Also, if lithium of the anode serving as the electrode active material melts or iron disulfide of the cathode breaks down, thermal runaway may occur, undesirably increasing the risk of explosion or rupture of the battery. In particular, in the case where an internal short-circuit occurs, such a risk is further increased.

Most lithium ion batteries are currently used at a comparatively low temperature of about 75° C. or less in order to decrease the risk of explosion and increase the lifetime thereof, and the ionic conductivity of the solid electrolyte is lower than that of the liquid electrolyte in such a low operating temperature range, making it difficult to improve power output performance. However, the risk of explosion due to thermal runaway may increase in a high operating temperature range, and thus the usable temperature range is limited.

A sodium-sulfur molten salt battery, operating at a high temperature, is inexpensive and has high energy storage efficiency and is thus useful as an energy storage system, but the specific energy thereof is low and there is an increasing need to develop an electrode material, including lithium as an ideal anode material, and a structure thereof.

CITATION LIST

Patent Literature

Korean Patent No. 10-1511206

SUMMARY OF THE INVENTION

Therefore, the present invention has been made keeping in mind the problems encountered in the related art, and the present invention is intended to provide a molten lithium-sulfur battery and a method of manufacturing the same, in which a solid electrolyte is used, whereby the usable temperature range becomes wide compared to existing molten salt electrolytes, overflow of an electrode active material may be prevented upon melting the electrode active material in a liquid phase, and problems such as electrolyte leakage and short-circuit, which conventionally occur when using existing molten salt electrolytes, may be solved.

Also, the present invention is intended to provide a molten lithium-sulfur battery and a method of manufacturing the same, in which a solid electrolyte may be used at higher temperatures than existing aqueous electrolytes or organic electrolytes, thereby improving power output characteristics due to an increase in ionic conductivity of the solid electrolyte.

Also, the present invention is intended to provide a molten lithium-sulfur battery and a method of manufacturing the same, in which a solid electrolyte is used, whereby the usable temperature range may be widened from room temperature to the boiling point (445° C.) of sulfur (S) to thus minimize the use of a chemical heat source and a thermal insulator, which are required for maintaining the temperature, thus decreasing the size and weight of a battery and increasing the operating time thereof.

Also, the present invention is intended to provide a molten lithium-sulfur battery and a method of manufacturing the same, in which a solid electrolyte may be manufactured using a hot pressing process for adding an atmosphere-adjusting powder to opposite ends of a metal foam, thus increasing the density and ionic conductivity of the solid electrolyte.

Also, the present invention is intended to provide a molten lithium-sulfur battery and a method of manufacturing the same, in which a metal foam, which is a conductive porous body, is used, thus simultaneously functioning as a binder for binding an electrode active material, a support for imparting mechanical rigidity, and a conductor for decreasing electrode resistance.

Also, the present invention is intended to provide a molten lithium-sulfur battery and a method of manufacturing the same, in which the battery is manufactured using a metal foam and a solid electrolyte and may thus be used not only for a disposable non-rechargeable battery but also for a rechargeable battery, the charging and discharging of which may be repeated.

Also, the present invention is intended to provide a molten lithium-sulfur battery and a method of manufacturing the same, in which a molten salt film may be interposed between the metal foam and the solid electrolyte, thus decreasing both interfacial contact resistance and electrode internal resistance to thus increase power output characteristics.

Therefore, the present invention provides a molten lithium-sulfur battery with a solid electrolyte, comprising: a sealed case; a solid electrolyte; a conductive metal foam having a plurality of pores; an anode using the metal foam as a binder and using lithium (Li) as an active material; and a cathode using the metal foam as a binder and using sulfur (S) as an active material.

In addition, the present invention provides a method of manufacturing the above molten lithium-sulfur battery, the method comprising manufacturing a cathode, the manufacturing the cathode comprising: a first addition step of adding a metal foam with a cathode active material; a second addition step of adding the surface of the metal foam with the cathode active material through a sulfuration reaction; and a third addition step of further adding the metal foam with the cathode active material.

In the first addition step, the metal foam may be added with the cathode active material by being immersed in molten sulfur.

In the first addition step, the molten sulfur may have a temperature of 150 to 200° C.

The first addition step may be performed by injecting a slurry comprising a sulfur (S) powder into pores of the metal foam.

In the second addition step, the surface of the metal foam may be subjected to sulfuration through thermal treatment to a predetermined temperature in a sealed metal case.

The thermal treatment in the sealed metal case may be performed at 400 to 600° C.

The third addition step may comprise impregnating the metal foam with molten sulfur.

In the third addition step, the impregnating may be performed at a temperature of 150 to 200° C.

The third addition step may be performed by injecting a slurry comprising a sulfur (S) powder or an iron disulfide ($FeS_2$) powder into the metal foam.

An anode may be manufactured by immersing or incorporating the metal foam in lithium (Li), which is melted through heating to a predetermined temperature.

The lithium may be heated to 200 to 500° C.

The anode may be manufactured in a glove box under an inert atmosphere.

An anode may be manufactured by injecting a slurry comprising a lithium (S) powder or a lithium alloy (LiSi) powder into the metal foam at room temperature.

A solid electrolyte interposed between the cathode and the anode may be manufactured through hot pressing.

The solid electrolyte may be manufactured by sequentially layering an atmosphere-adjusting powder, a multilayered electrolyte powder, and the atmosphere-adjusting powder.

The atmosphere-adjusting powder may be composed of a material that is the same as that of the solid electrolyte.

The atmosphere-adjusting powder may comprise a lithium-rich powder.

A graphite sheet may be disposed between individual layers comprising powder in order to separate the individual layers upon manufacturing the solid electrolyte.

A molten salt film may be disposed between the metal foam and the solid electrolyte.

The molten salt film may be manufactured through powder compaction.

The molten salt film may comprise a lithium-based eutectic salt and an ionic liquid.

The lithium-based eutectic salt may be any one or a mixture of two or more selected from among LiCl—KCl, LiCl—LiBr—KBr, LiF—LiBr—KBr, $LiNO_3$—$NaNO_3$—$KNO_3$, $LiNO_3$—$NaNO_3$—$KNO_3$—$NaNO_2$, and LiCl—$LiNO_3$—$NaNO_2$.

The ionic liquid may be any one or a mixture of two or more selected from among tetramethylammonium bis(trifluoromethanesulfonyl)imide, triethylsulfonium bis(trifluoromethylsulfonyl)imide, N-methyl-N-trioctylammonium bis (trifluoro-methylsulfonyl)imide, and N-butyl-N-methylpyrrolidinium bis(trifluoro-methylsulfonyl)imide.

The molten salt film may be manufactured by applying or inserting a molten salt powder on or into both contact surfaces of the solid electrolyte and the anode or the cathode.

The metal foam may be provided as a single layer or multiple layers.

When the metal foam is provided as a single layer between the electrolyte and the current collector, the diameter of pores in the metal foam may be gradually decreased in a thickness direction of the metal foam.

When the metal foam is provided as multiple layers between the electrolyte and the current collector, the diameter of the pores formed in each of the multiple layers of the metal foam may be gradually decreased moving toward the current collector from the electrolyte.

The metal foam may be coated with a molten salt before use as the anode and the cathode.

The metal foam may be coated by being immersed in a molten salt bath or a saturated salt solution.

The metal foam may be formed of either iron (Fe) or nickel (Ni).

According to the present invention, a solid electrolyte is used, whereby the usable temperature range can be widened compared to existing molten salt electrolytes, and upon melting the liquid-state electrode active material, overflow of the active material can be prevented, and problems such as electrolyte leakage and short-circuit, which occur when using the existing molten salt electrolytes, can be solved.

Also, the solid electrolyte can be used at higher temperatures than existing aqueous or organic electrolytes, thus effectively increasing power output characteristics due to an increase in the ionic conductivity of the solid electrolyte.

Also, when the solid electrolyte is used, the usable temperature range is widened from room temperature to the boiling point (445° C.) of sulfur (S) to thus minimize the use of a chemical heat source and a thermal insulator, which are required for maintaining the temperature, thereby decreasing the size and weight of a battery and increasing the operating time thereof.

Also, the solid electrolyte can be manufactured using a hot pressing process for adding an atmosphere-adjusting powder to opposite ends of a metal foam, thus increasing the density and ionic conductivity of the solid electrolyte.

Also, the metal foam, which is a conductive porous body, is used, and thus can simultaneously function as a binder for binding an electrode active material, a support for imparting mechanical rigidity, and a conductor for decreasing electrode resistance.

Also, a battery is manufactured using a metal foam and a solid electrolyte and can thus be used not only for a disposable non-rechargeable battery but also for a rechargeable battery, the charging and discharging of which can be repeated.

Also, the battery is configured such that a molten salt film is interposed between the metal foam and the solid electrolyte, thus decreasing both interfacial contact resistance and electrode internal resistance to thereby increase power output characteristics.

DESCRIPTION OF THE SPECIFIC EMBODIMENTS

Figure 1:
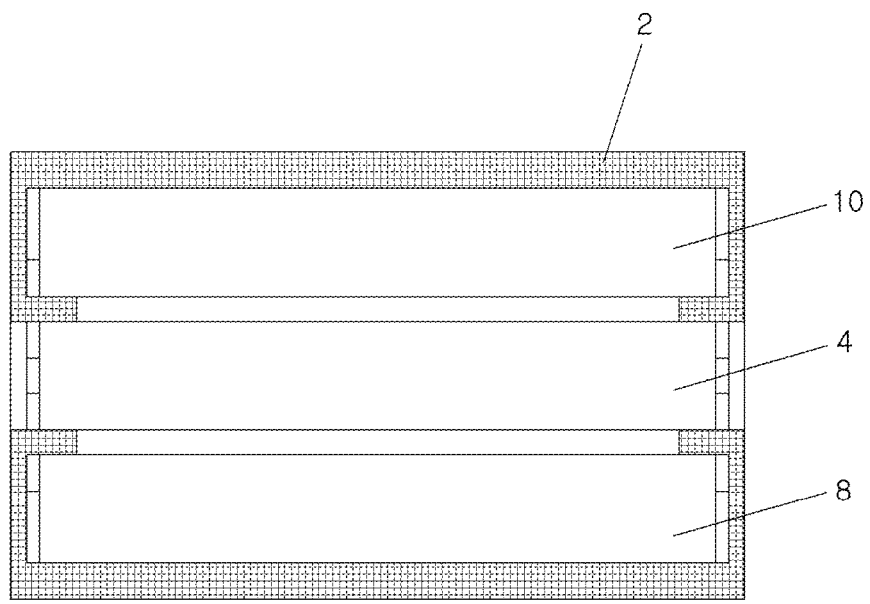
FIG. 1 shows the flat structure of a lithium-sulfur battery according to the present invention.

The features and advantages of the present invention will be more clearly understood from the following detailed description taken in conjunction with the accompanying drawings, and thus the technical idea of the present invention may be easily performed by those skilled in the art to which the present invention belongs. The embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

Hereinafter, a detailed description will be given of preferred embodiments of the present invention, with reference to the accompanying drawings.

The present invention pertains to a lithium-sulfur battery and a method of manufacturing the same, and more particularly to a molten salt-based lithium-sulfur battery, in which a metal foam including lithium as an anode active material and sulfur as a cathode active material is used as a support and a current collector, and in which a solid-state electrolyte is used, thus increasing energy density and power output characteristics, and to a method of manufacturing the same.

According to the present invention, the battery includes a sealed case 2, a solid electrolyte 4, a metal foam 6, an anode 8 using the metal foam 6 as a binder and using lithium (Li) or a lithium alloy 16 as an active material, and a cathode 10 using the metal foam 6 as a binder and using sulfur (S) or a sulfide 14 as an active material.

Here, the anode 8, the cathode 10, and the solid electrolyte 4 are manufactured as follows.

Specifically, the metal foam 6, which is used as the support of the anode 8 and the cathode 10, is described. The metal foam 6 has therein a plurality of pores and is conductive, and is formed of either iron (Fe) or nickel (Ni).

The metal foam 6 is coated with a molten salt by being immersed in a molten salt bath or a saturated salt solution before use as the support of the anode 8 and the cathode 10 in order to improve wetting properties of the metal foam 6 and the anode active material and the cathode active material.

The anode 8 and the cathode 10 are manufactured by using the metal foam 6 having many pores as the support, thus ensuring formability and structural stability even without the addition of a typical binder.

When the metal foam 6 having the pore structure that accommodates only an electrode active material is used, it is possible to load the active material in a larger amount, thus further increasing the capacity of the battery.

The method of manufacturing the cathode 10 using the metal foam 6 as the support includes a first addition step of adding the metal foam 6 with a cathode active material, a second addition step of adding the surface of the metal foam 6 with the cathode active material through a sulfuration reaction, and a third addition step of further adding the metal foam 6 with the cathode active material.

The first addition step is performed in air, and the metal foam 6 is impregnated with molten sulfur. The metal foam 6 is immersed in sulfur (S) 14, which is melted through heating to the range from about 150 to 200° C., whereby the metal foam 6 is added with the cathode active material. The heating temperature in the first addition step is at least 150° C., at which the viscosity of sulfur (S) 14 is the lowest.

Alternatively, the first addition step may be implemented in a manner such that a slurry comprising a powder of sulfur (S) 14 is injected into pores in the metal foam 6.

In the second addition step, the metal foam 6 obtained in the first addition step is heated to a temperature of 400 to 600° C. in a sealed metal case so that the surface of the metal foam 6 is subjected to sulfuration. Here, the surface of the metal foam 6 is immersed in sulfur and thus the cathode active material is added to the metal foam 6 while the sulfuration is carried out.

Typically, a cathode 10 using sulfur or sulfide 14 as an active material is rapidly decreased in its capacity due to the high resistance thereof, and thus the real-world application thereof becomes difficult. With the goal of improving the low electrical conductivity of sulfur 14, the metal foam 6 is subjected to sulfuration with sulfur 14 as an active material.

In the third addition step, the metal foam 6 subjected to the second addition step is further added with the molten sulfur 14 and is thus impregnated therewith. The impregnation of the metal foam 6 is carried out in air at a temperature of 150 to 200° C.

Alternatively, the third addition step may be implemented in a manner such that a slurry comprising a powder of sulfur (S) 14 or iron disulfide ($FeS_2$) is injected into pores in the metal foam 6 subjected to the second addition step.

The cathode 10 may be manufactured by performing the first addition step, the second addition step and the third addition step.

The anode 8 using the metal foam 6 as a support is manufactured in a manner in which the metal foam 6 is immersed or incorporated in lithium (Li) 16, which is melted by being heated at 200 to 500° C. in a glove box under an inert atmosphere, or in a manner in which a slurry comprising a powder of lithium (Li) 16 or a lithium alloy (LiSi) is injected into pores in the metal foam 6 at room temperature.

Figure 4:
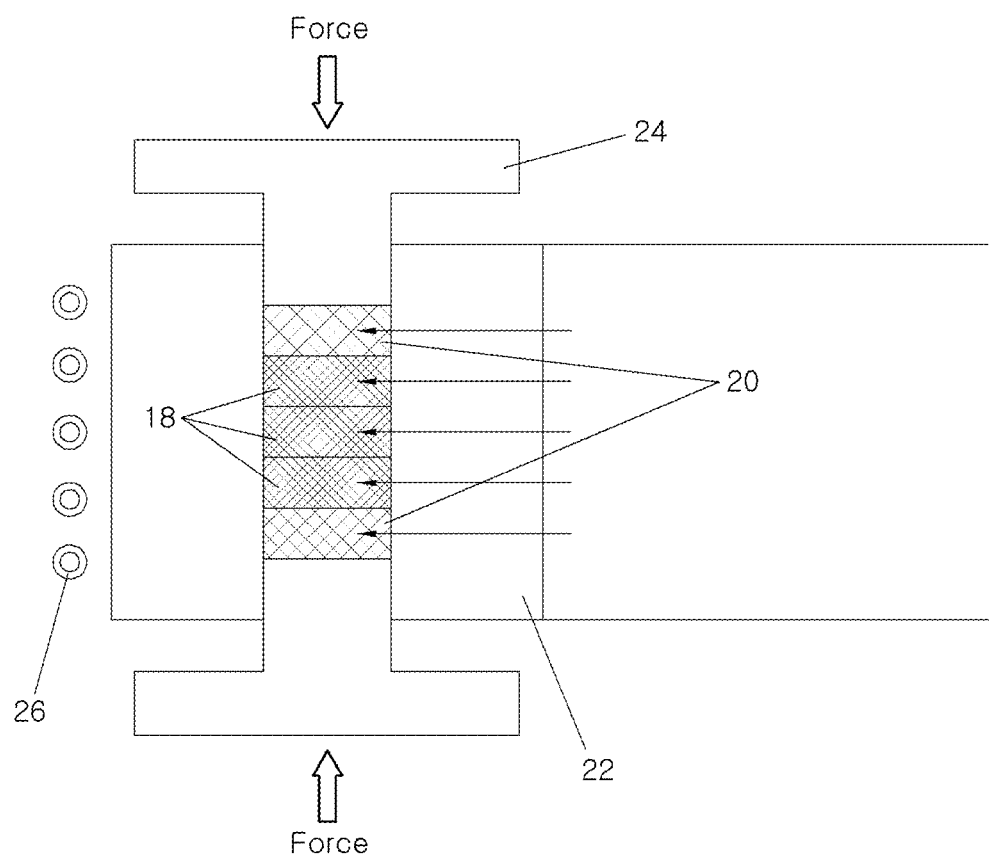
FIG. 4 shows the hot pressing process of a solid electrolyte according to the present invention.

The solid electrolyte ($Li_7La_3Zr_2O_{12}$) 4, which is interposed between the anode 8 and the cathode 10, is processed through hot pressing at a temperature about 300° C. lower than that of typical atmospheric sintering, which is about 1200° C., as shown in FIG. 4. As the sintering temperature is lower, volatility may decrease to thus minimize changes in stoichiometric composition, thereby obtaining a solid electrolyte 4 in a desired phase.

The solid electrolyte 4 is manufactured by sequentially layering an atmosphere-adjusting powder 20, a multilayered electrolyte powder 18, and the atmosphere-adjusting powder 20. The atmosphere-adjusting powder 20 may be formed of the same material as the solid electrolyte 4, or a Li-rich powder may be used.

Upon hot pressing, the atmosphere-adjusting powder 20 is added to the upper and lower ends of the solid electrolyte 4, thereby adjusting the stoichiometric composition of the solid electrolyte 4 to thus drastically increase the sintering density and the ionic conductivity. Furthermore, multiple solid electrolytes 4 having a uniform composition may be formed through a single hot pressing process in an ambient atmosphere.

When the solid electrolyte 4 is manufactured, a graphite sheet is interposed between individual layers comprising powder and then hot pressing is performed in order to efficiently separate the individual layers.

When the solid electrolyte 4 is used, problems with a molten salt electrolyte, such as an increase in internal resistance of the battery due to the lack of the electrolyte or generation of short-circuit of the electrode, may be physically prevented, thus alleviating safety problems.

Moreover, the solid electrolyte 4 may endure the high pressure of sulfur having high vapor pressure at high operating temperatures compared to the molten salt electrolyte in a semi-liquid state at the operating temperature of the battery.

Also, compared to the existing molten salt electrolyte, which is limitedly capable of operation at high temperatures, the solid electrolyte 4 has a wide usable temperature range and overflow of the molten liquid electrode active material may be prevented, and furthermore, leakage of the volatilized gas and short-circuit may be effectively prevented.

A molten salt film having a low melting point is interposed between the anode 8 and the solid electrolyte 4 and between the cathode 10 and the solid electrolyte 4. The molten salt film may decrease both the interfacial contact resistance and the electrode internal resistance, thus improving power output characteristics.

The molten salt film may be formed through powder compaction, or alternatively, may be disposed by uniformly applying or inserting a molten salt powder on or into the contact surface of the solid electrolyte 4 and the anode 8 and the contact surface of the solid electrolyte 4 and the cathode 10.

The molten salt film is formed of a lithium-based eutectic salt, such as LiCl—KCl, LiCl—LiBr—KBr, LiF—LiBr—KBr, $LiNO_3$—$NaNO_3$—$KNO_3$, $LiNO_3$—$NaNO_3$—$KNO_3$—$NaNO_2$, and LiCl—$LiNO_3$—$NaNO_2$, each of which has a low melting point, and an ionic liquid such as tetramethylammonium bis(trifluoromethanesulfonyl)imide, triethylsulfonium bis(trifluoromethylsulfonyl)imide, N-methyl-N-trioctylammonium bis(trifluoro-methylsulfonyl)imide, and N-butyl-N-methylpyrrolidinium bis(trifluoro-methylsulfonyl)imide.

Figure 2:
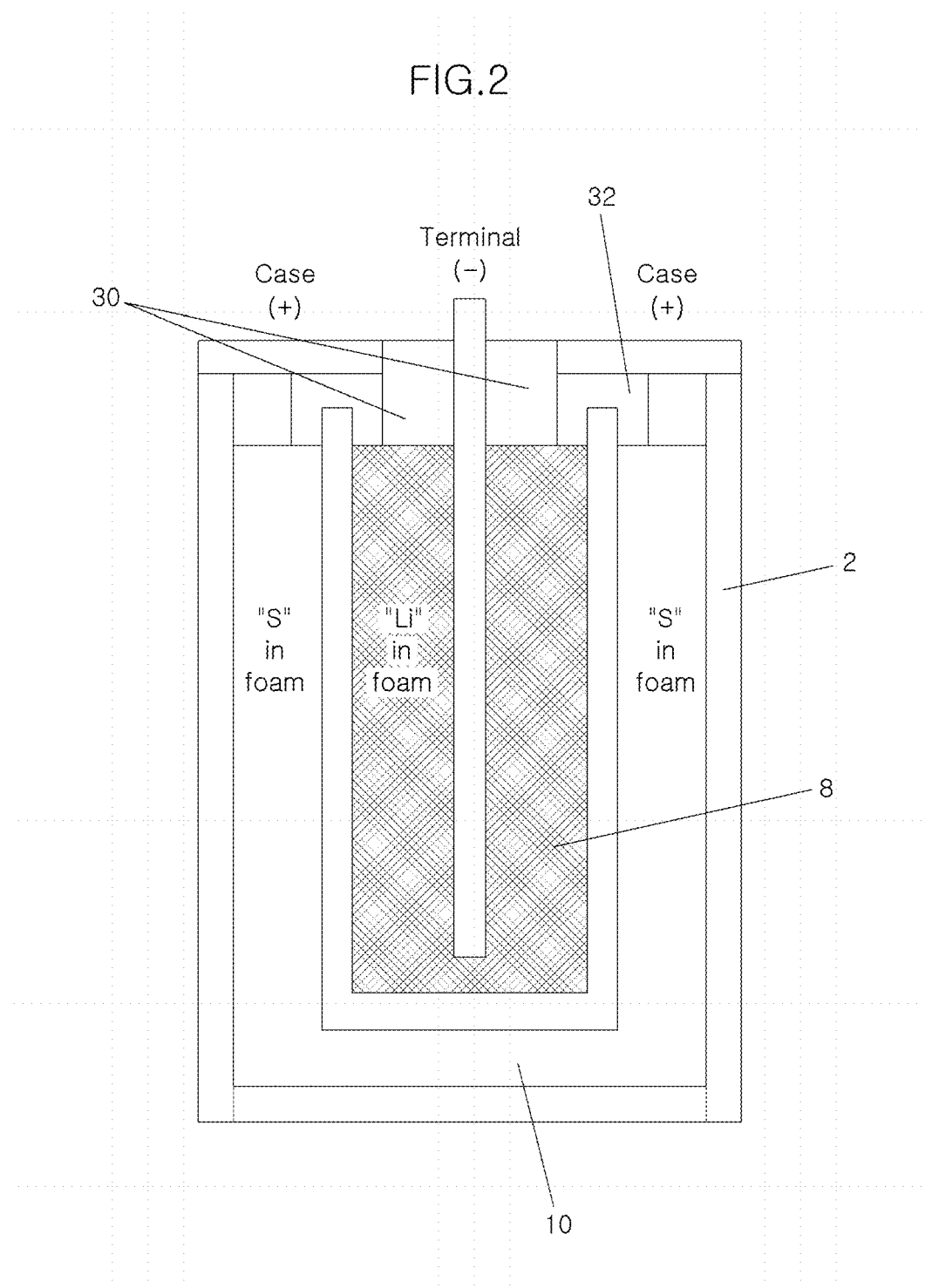
FIG. 2 shows the cylindrical structure of a lithium-sulfur battery according to the present invention.

The lithium-sulfur battery thus configured according to the present invention may be manufactured in the form of a flat or cylindrical shape as shown in FIGS. 1 and 2.

When it is manufactured in a flat shape, the battery is manufactured in a manner in which the anode 8, the solid electrolyte 4, and the cathode 10 are sequentially layered inside the sealed case 2.

When it is manufactured in a cylindrical shape, the battery is manufactured in a manner in which the anode 8 is layered in a cylindrical shape inside the cylindrical sealed case 2, the solid electrolyte 4 is layered in a cylindrical shape inside the anode 8, the cathode 10 is layered inside the solid electrolyte 4, and then sealing is performed using a glass-metal seal 30 or a glass sealant 32.

Figure 3:
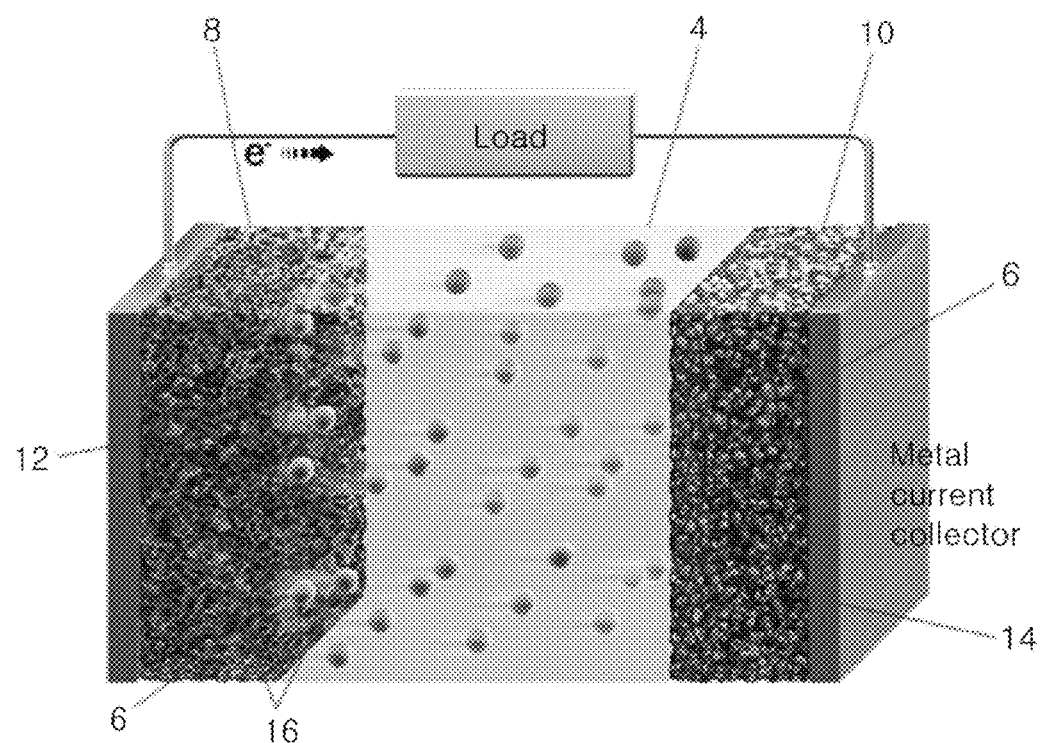
FIG. 3 shows the operating principles of FIGS. 1 and 2.

The lithium-sulfur battery thus manufactured operates according to the operating principle shown in FIG. 3.

Figure 5:
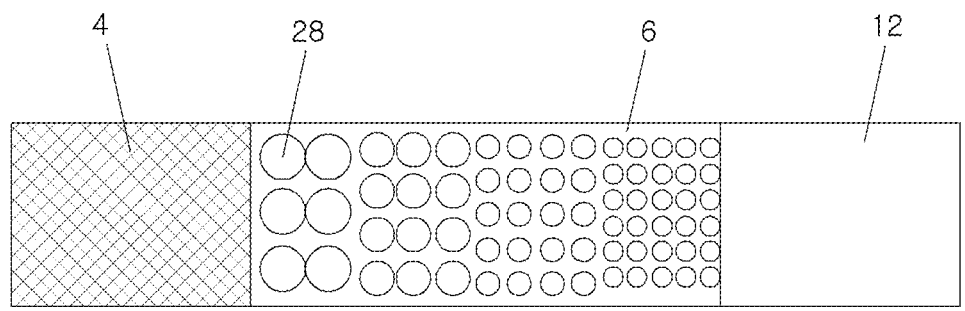
FIG. 5 shows the monolayered structure of a metal foam according to the present invention.
Figure 6:
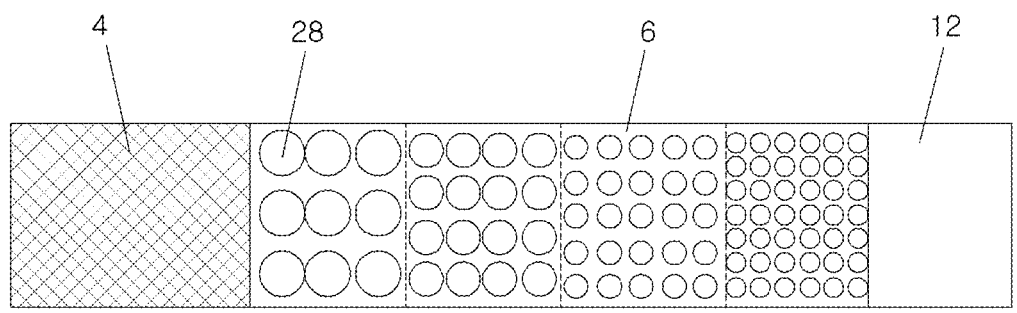
FIG. 6 shows the multilayered structure of a metal foam according to the present invention.

FIG. 5 shows the monolayered structure of the metal foam 6 according to the present invention, and FIG. 6 shows the multilayered structure of the metal foam 6 according to the present invention.

When the anode 8 or the cathode 10 is manufactured using the metal foam 6 as the support, the metal foam 6 may be provided in the form of a single layer or multiple layers.

When the metal foam 6 is provided in the form of a single layer between the solid electrolyte 4 and the current collector 12, the diameter of the pores 28 formed in the metal foam 6 is gradually decreased in the thickness direction of the metal foam 6.

When the metal foam 6 is provided in the form of multiple layers between the solid electrolyte 4 and the current collector 12, the diameter of the pores 28 formed in each of the multiple layers of the metal foam 6 is gradually decreased moving toward the current collector 12 from the solid electrolyte 4. Upon manufacturing multiple pieces of metal foam 6, the sizes of the pores 28 in respective pieces of metal foam 6 are differently formed, and thus the pieces of metal foam 6 are layered in the sequence of size of the pores 28.

When the diameter of the pores 28 in the metal foam is large, the extent of blocking the path near the electrode-electrolyte interface may decrease even upon adsorption of the transfer material, and thus, the metal foam may function as the material transfer path for a longer period of time. Furthermore, the pores are responsible for the functions of both the material transfer path and the active material storage site.

Figure 7:
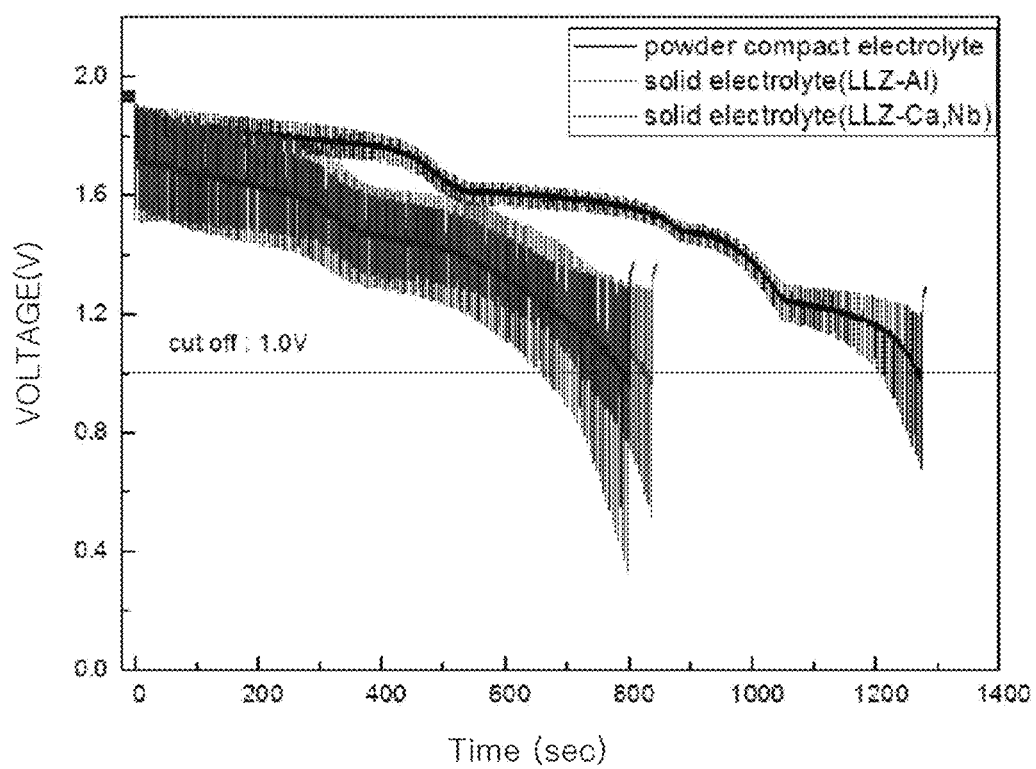
FIG. 7 is a graph showing the discharging properties of a LiSi—$FeS_2$ unit cell and a lithium-sulfur unit cell according to the present invention.
Figure 8:
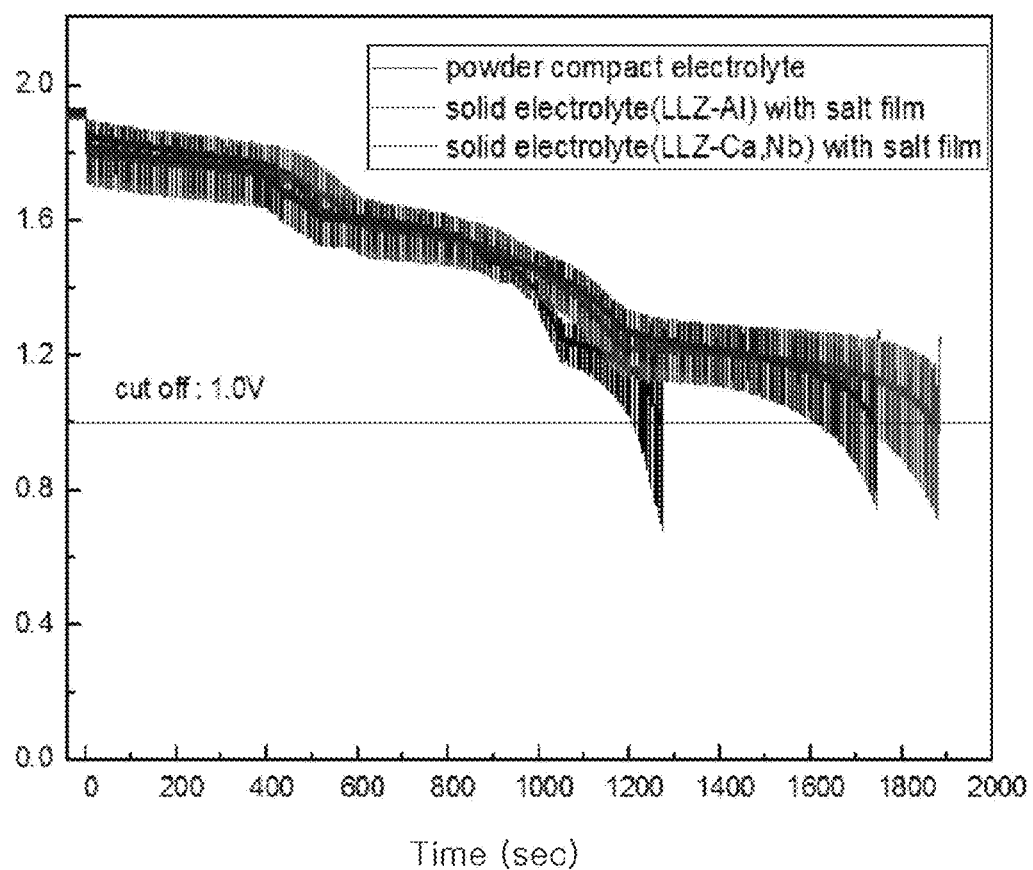
FIG. 8 is a graph showing the discharging properties of a LiSi—$FeS_2$ unit cell and a lithium-sulfur unit cell according to the present invention, in which a molten salt film is further included between the electrode and the electrolyte.

FIG. 7 is a graph showing the discharging properties of a LiSi—$FeS_2$ unit cell and a lithium-sulfur unit cell according to the present invention, and FIG. 8 is a graph showing the discharging properties of a LiSi—$FeS_2$ unit cell and a lithium-sulfur unit cell in the presence of the molten salt film between the electrode and the electrolyte according to the present invention.

As shown in FIG. 7, when the molten salt film is not added between the electrode and the electrolyte, the discharging properties of the LiSi—$FeS_2$ unit cell, represented as a black color, are superior to the discharging properties of the lithium-sulfur unit cell according to the present invention, represented as a red color and a blue color. However, when the molten salt film is added between the electrode and the electrolyte, as shown in FIG. 8, the discharging properties of the lithium-sulfur unit cell according to the present invention, represented as a red color and a blue color, are improved compared to the discharging properties of the LiSi—$FeS_2$ unit cell, represented as a black color.

In the lithium-sulfur battery according to the present invention, the solid electrolyte 4 plays a role in increasing the usable temperature range from room temperature to the boiling point (445° C.) of sulfur (S), thus minimizing the use of a chemical heat source and a thermal insulator, which are required to maintain the temperature. Therefore, the size and weight of the battery may be decreased and the operating time thereof may be increased.

Furthermore, as the metal foam 6, which is a conductive porous body, is used, it is effective at simultaneously functioning as a binder for binding the electrode active material, a support for imparting mechanical rigidity, and a conductor for decreasing electrode resistance.

Also, the solid electrolyte is used, in lieu of a molten salt electrolyte, the use field of which is limited to disposable batteries, and is thus effectively applied to a rechargeable battery, in which charging and discharging are repeated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a molten lithium-sulfur battery, the method comprising manufacturing a cathode, wherein the manufacturing the cathode comprises:
   a first step of adding a cathode active material to a metal foam by immersing the metal foam in molten sulfur;
   a second step of subjecting a surface of the metal foam to sulfuration through heat treatment of the surface of the metal foam, which is obtained from the first step, in a sealed metal container; and
   a third step of additionally adding the cathode active material to the metal foam, which is obtained from the second step, by further immersing the metal foam in molten sulfur,
   wherein the molten lithium-sulfur battery includes:
   a sealed case;
   a solid electrolyte;
   a conductive metal foam having a plurality of pores;
   an anode using the metal foam and using lithium (Li) or a lithium alloy as an active material being accommodated into the metal foam; and
   a cathode using the metal foam and using sulfur (S) or a sulfide as an active material.

2. The method of claim 1, wherein in the first step, the molten sulfur has a temperature of 150 to 200° C.

3. The method of claim 1, wherein the heat treatment in the sealed metal container is performed at 400 to 600° C.

4. The method of claim 1, wherein the third step comprises impregnating the metal foam with molten sulfur.

5. The method of claim 4, wherein in the third step, the impregnating is performed at a temperature of 150 to 200° C.

6. The method of claim 1, wherein the third step is performed by injecting a slurry comprising a sulfur (S) powder or an iron disulfide ($FeS_2$) powder into the metal foam.

7. The method of claim 1, wherein an anode is manufactured by immersing or incorporating the metal foam in lithium (Li) that is melted through heating to a predetermined temperature.

8. The method of claim 7, wherein the lithium is heated to 200 to 500° C.

9. The method of claim 1, wherein an anode is manufactured by injecting a slurry comprising a lithium (S) powder or a lithium alloy (LiSi) powder into the metal foam at room temperature.

10. The method of claim 1, wherein the solid electrolyte is interposed between the cathode and the anode and is manufactured through hot pressing.

11. The method of claim 10, wherein the solid electrolyte is manufactured by sequentially layering an atmosphere-adjusting powder, a multilayered electrolyte powder, and the atmosphere-adjusting powder.

12. The method of claim 11, wherein the atmosphere-adjusting powder is composed of a material that is the same as a material of the solid electrolyte.

13. The method of claim 12, wherein the atmosphere-adjusting powder comprises a lithium-rich powder.

14. The method of claim 11, wherein a graphite sheet is disposed between individual layers comprising powder in order to separate the individual layers upon manufacturing the solid electrolyte.

15. The method of claim 10, wherein a molten salt film is disposed between the metal foam and the solid electrolyte.

16. The method of claim 15, wherein the molten salt film is manufactured through powder compaction.

17. The method of claim 15, wherein the molten salt film comprises a lithium-based eutectic salt and an ionic liquid.

18. The method of claim 17, wherein the lithium-based eutectic salt is any one or a mixture of two or more selected from among LiCl—KCl, LiCl—LiBr—KBr, LiF—LiBr—KBr, $LiNO_3$—$NaNO_3$—$KNO_3$, $LiNO_3$—$NaNO_3$—$KNO_3$—$NaNO_2$, and LiCl—$LiNO_3$—$NaNO_2$.

19. The method of claim 17, wherein the ionic liquid is any one or a mixture of two or more selected from among tetramethylammonium bis(trifluoromethanesulfonyl)imide, triethylsulfonium bis(trifluoromethylsulfonyl)imide, N-methyl-N-trioctylammonium bis(trifluoro-methylsulfonyl)imide, and N-butyl-N-methylpyrrolidinium bis(trifluoro-methylsulfonyl)imide.

20. The method of claim 15, wherein the molten salt film is manufactured by applying or inserting a molten salt powder on or into both contact surfaces of the solid electrolyte and the anode or the cathode.

21. The method of claim 1, wherein the metal foam is provided as a single layer or multiple layers.

22. The method of claim 21, wherein when the metal foam is provided as the single layer between an electrolyte and a current collector,
   a diameter of pores of the metal foam is gradually decreased in a thickness direction of the metal foam.

23. The method of claim 21, wherein when the metal foam is provided as the multiple layers between an electrolyte and a current collector,
   a diameter of pores formed in each of the multiple layers of the metal foam is gradually decreased moving toward the current collector from the electrolyte.

24. The method of claim 1, wherein the metal foam is coated with a molten salt before use as an anode and the cathode.

25. The method of claim 24, wherein the metal foam is coated by being immersed in a molten salt bath or a saturated salt solution.

26. The method of claim 1, wherein the metal foam is formed of either iron (Fe) or nickel (Ni).

27. A method of manufacturing a molten lithium-sulfur battery, the method comprising manufacturing a cathode, wherein the manufacturing the cathode comprises:
   a first step of adding a cathode active material to a metal foam by injecting a slurry comprising a sulfur (S) powder into a plurality of pores of the metal foam;
   a second step of subjecting a surface of the metal foam to sulfuration through heat treatment of the surface of the metal foam, which is obtained from the first step, in a sealed metal container; and
   a third step of additionally adding the cathode active material to the metal foam, which is obtained from the second step, by further immersing the metal foam in molten sulfur,
   wherein the molten lithium-sulfur battery includes:
   a sealed case;
   a solid electrolyte;
   a conductive metal foam having a plurality of pores;

an anode using the metal foam and using lithium (Li) or a lithium alloy as an active material being accommodated into the metal foam; and a cathode using the metal foam and using sulfur (S) or a sulfide as an active material.

28. The method of claim 27, wherein the heat treatment in the sealed metal container is performed at 400 to 600° C.

* * * * *